United States Patent Office 3,095,316
Patented June 25, 1963

3,095,316
PROCESS FOR COATING CARBONACEOUS ARTICLES WITH SILICON DIOXIDE
Jurgen Hartwig, Fostoria, Ohio, assignor to Union Carbide Corporation, a corporation of New York
No Drawing. Filed Sept. 30, 1959, Ser. No. 843,363
8 Claims. (Cl. 117—16)

This invention relates to a process for coating carbonaceous materials with silicon carbide.

Carbon in its various physical structures and fabricated modifications exhibits excellent mechanical and refractory properties which suggest its use as structural material for many high temperature applications as for instance in rocket engines and nuclear reactors. Poor resistance against oxidation and erosion are the main detrimental characteristics of carbon products in these refractory applications. For this reason many attempts have been made to apply various coatings to the carbon, which yield good oxidation and erosion resistance, but do not interfere with the original good properties of the respective carbon materials.

The principal objects of the present invention are to provide carbonaceous articles with oxidation and erosion resistant coatings of either predominately alpha- or predominately beta-silicon carbide and a novel process of making such coated carbonaceous articles.

A simplified flow-diagram of the process of the invention is as follows:

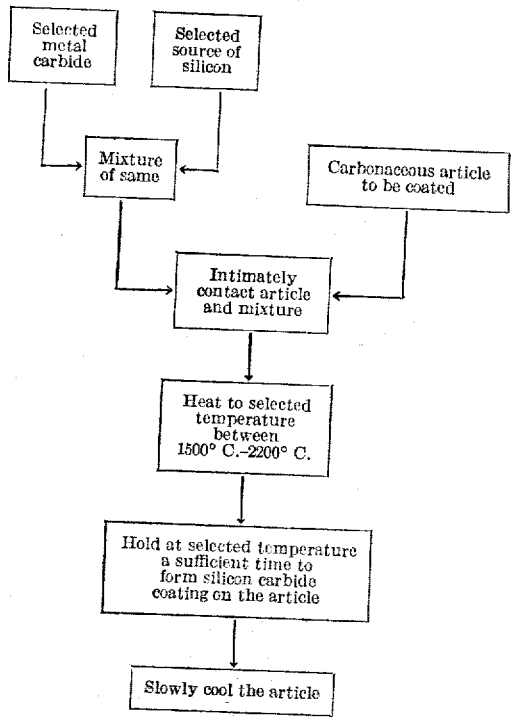

In the practice of the invention, regular or irregular shapes of carbon or graphite may be coated with either α-silicon carbide (SiC) or β-silicon carbide, or both. Excellent oxidation resistance is derived from α-silicon carbide coatings, while coatings consisting of β-SiC were found to provide good erosion resistance, especially in rocket motor applications. The crystal structure of the SiC coating depends on the coating temperature. α-SiC coatings are formed above 1900° C., while lower coating temperatures result in coatings of β-SiC. Strength and thickness of both coatings are largely effected by the properties of the base carbon material, such as the extent of graphitization, the porosity grain orientation and the coefficient of thermal expansion.

In the practice of the invention, carbon articles to be coated are packed in powder mixtures or brought into intimate contact with mixtures of silicon metal and/or silicon dioxide with titanium carbide and heated to temperatures in the range from 1500° C. to 2100° C. The purpose of the titanium or other carbide is to act as a vehicle or carrier for the coating material. Where silicon metal is employed, its concentration should be low enough to prevent sintering of the mixture, but should be high enough to completely coat the graphite. Instead of titanium carbide, any other carbide may be used, provided it has a sufficiently high melting point, a wide range of stability with respect to carbon content and a somewhat higher or equal free energy of formation as silicon carbide. Therefore, the carbides of zirconium, hafnium, tantalum and silicon may be used separately instead of TiC or in mixtures with one another and TiC. The coating process can be characterized by the following equations which are intended to describe the general process rather than a fixed stoichiometry:

(1) $Me_xC_y + Si \rightleftharpoons Me_nC_m + SiC$
  $x/y \angle n/m$
(2) $Me_xC_y + SiO_2 \rightarrow Me_nC_m + SiC + CO$
(3) $Me_nC_m + SiC + C^x \rightarrow Me_xC_y + SiC$ coating
  $C^x$ = carbon surface to be coated

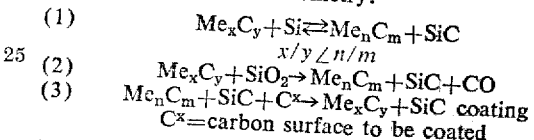

It is essential to this process, that by the action of the carbide, for instance, TiC as carrier for the silicon metal, and by the equilibrium Equation 1 the silicon metal never forms a molten phase. However, the activity of silicon in the equilibrium-Equation 1 is sufficient for reaction with carbon surfaces and for the formation of SiC coatings. Furthermore, it is important that the silicon diffuses from the coating mixture to the carbon surfaces and thus SiC (by Reaction 3) is formed on this carbon surface. It was found that for instance, in a mixture of titanium carbide with titanium metal (instead of silicon metal) the carbon diffused from the surface of a carbon article into the surrounding TiC-Ti mix, forming a TiC shell on the mix side around but not adhering to the carbon body.

The structure of the resulting silicon carbide coating can be controlled by the coating temperature. Coatings consisting mainly of β-SiC are formed at coating temperatures below 1800° C., while α-SiC is the main constituent of coatings formed above 1900° C. The carbon articles which are packed together with the coating mixture into a suitable graphite capsule are heated to the final coating temperature. Hold times at that temperature may vary from about one to six hours, depending on the grade of graphite or carbon to be coated and the desired coating properties, such as thickness, infiltration into the carbon or graphite, etc. Cooling, following the hold period, should proceed relatively slowly. By this means, "thermal expansion cracks" in the coatings which sometimes occur upon cooling can be healed or filled even in the lower temperature range down to about 1500° C. Other cooling cycles can, however, be applied for certain coating applications.

The following examples and experimental results illustrate the practice and feasibility of the process of the invention:

EXAMPLE 1

Graphite nozzles, 2 inches in length and 2½ inches in outside diameter, with a ⅜ inch diameter throat, were packed in a powder mixture of 80 percent TiC, 10 percent Si and 10 percent SiO₂ (by weight) and heated in a graphite crucible to 1750° C. for five hours with a subsequent slow cooling cycle of about 30° C. temperature drop per hour. The nozzles were unpacked, cleaned from loosely adhering packing material and tested for performance in a rocket motor (oxygen-kerosene-torch). Results are presented in Table I below.

EXAMPLE 2

Graphite nozzles of the same size as in Example 1 were packed in a powder mixture of 80 percent TiC and 20 percent Si (by weight) and heated in a graphite crucible to 1950° C. for five hours with a subsequent slow cooling cycle of about 30° C. temperature drop per hour. After unpacking and cleaning the nozzles were tested in a rocket motor (oxygen-kerosene-torch). Test results are presented together with those from Example 1 in Table I:

*Table I*

| Nozzle Graphite Grade [1] | Coating Temperature | Predominant Coating Structure | Life Time In Torch Test [2] (Sec.) |
|---|---|---|---|
| A | Not Coated | | 14 |
| B | Not Coated | | 3 |
| A | 1,750° C | β-SiC | 77 |
| B | 1,750° C | β-SiC | 43 |
| A | 1,950° C | α-SiC | 62 |
| B | 1,950° C | α-SiC | 52 |

[1] See Table II.
[2] Firing time to 5 percent drop in combustion chamber pressure.

EXAMPLE 3

Samples of different graphite grades were packed into a powder mixture of 80 percent TiC and 20 percent Si (by weight) and heated for four hours to 1900° C. After a slow cooling cycle—30° C. temperature drop per hour to 1000° C.—the samples were unpacked and loosely adhering packing material was removed. The following results, shown on Table II, were obtained from oxidation tests on these samples in 1000° C. air.

*Table II*

WEIGHT LOSS AFTER 90 HOURS' TEST

| Graphite Grade [1] | Total Percent by Weight | g./cm.² Surface/hour |
|---|---|---|
| A | 0.07 to 1.80 | $10^{-6}$ to 0.00002 |
| B | $10^{-2}$ to 3.00 | $10^{-6}$ to 0.00003 |
| C | $10^{-2}$ to 0.09 | $10^{-6}$ to 0.00003 |

[1] A is a fine pore size, pitch-treated, graphitized coke base material; B is a medium pore size, pitch-treated, graphitized coke base; C is a fine grain medium density and pore size electrographitic lampblack base material.

The foregoing process holds important advantages over other conventional processes in which a vapor, containing silicon or silicon compounds, or a liquid phase of silicon reacts with carbonaceous surfaces at high temperatures forming silicon carbide coatings.

A primary advantage of the process of this invention is the possibility of obtaining the desired structure of silicon carbide—either alpha or beta—in the coating by heating to a certain temperature during the coating process. This selection of a desired silicon carbide structure is not possible by other existing processes. Such processes do not result in predominantly α-SiC even at high temperature ranges. Another advantage of the instant process is the intimate contact of the coating medium (silicon) with the graphite surface throughout the coating bake. In the "vapor phase" processes, as the temperature drops on cooling, the silicon metal vapor pressure drops off rapidly. Thus insufficient silicon vapor remains to completely fill cracks (with silicon carbide) developed on cooling because of differences in thermal expansion between the coating and the substrate. In this process, because the silicon is held so close to the graphite surface the cracks are continually filled and sealed with silicon carbide down to temperatures in the range of 1500° C. This is at least partially accomplished by solid state diffusion of the silicon from the packing medium to the graphite surfaces.

Intricate shapes such as small I.D. tubes, nozzles, etc., may be uniformly coated on all surfaces, which is not possible by the vapor phase processes because of insufficient convection and nonuniform reaction. Furthermore, the instant technique lends itself to coating much larger objects than can be done by the vapor phase process with presently available furnaces. Selected areas may be coated by the present process by properly locating the coating mixture or simply by masking certain areas of the articles to be coated.

What is claimed is:
1. A carbonaceous article having an oxidation and erosion resistant surface coating consisting predominantly of an adherent unitary layer of alpha silicon carbide.

2. A process for coating carbonaceous articles with surface coatings of silicon carbide, comprising bringing said article into intimate contact with a mixture of at least one metal carbide selected from the group consisting of silicon carbide, titanium carbide, zirconium carbide, hafnium carbide and tantalum carbide and at least one powdered source of silicon selected from the group consisting of silicon metal and silicon dioxide; heating said article and the surrounding mixture in a suitable container to temperatures ranging from 1500 to 2200° C.; maintaining said final temperature for a time necessary for formation of a coating, and slowly cooling said articles.

3. The process of claim 2 wherein said mixture has a metal carbide content ranging from 40 to 90 percent, the remainder of 60 to 10 percent being a source of silicon.

4. The process of claim 2 wherein said mixture consists of 80 percent titanium carbide and 20 percent silicon metal.

5. The process of claim 2 wherein said mixture consists of 80 percent silicon carbide and 20 percent silicon metal.

6. The process of claim 2 wherein said carbonaceous articles and mixtures are heated to a temperature between 1500 and 1850° C. to form coatings of predominantly beta silicon carbide.

7. The process of claim 2 wherein said carbonaceous articles and mixtures are heated to a temperature between 1850 and 2200° C. to form predominantly alpha silicon carbide.

8. A process for coating a carbonaceous article with an oxidation-resistant surface coating consisting essentially of at least one carbide from the group consisting of alpha silicon carbide and beta silicon carbide comprising placing said article in a refractory enclosure, surrounding said article with a powdered packing mixture containing a powdered carrier carbide selected from the group consisting of silicon carbide, titanium carbide, zirconium carbide, hafnium carbide and tantalum carbide having a free energy of formation at least equal to that of silicon carbide, and a powdered source of silicon selected from the group consisting of silicon metal and silicon dioxide; rapidly heating said packed article at a heating rate ranging from about 3 to 30° C. per minute to a final temperature ranging from 1500° C. to 2000° C.; maintaining said final temperature for a time ranging from about 1 to about 6 hours, and slowly cooling said article at a rate ranging from 20 to 100° C. per hour.

References Cited in the file of this patent

UNITED STATES PATENTS

| | | |
|---|---|---|
| 1,483,507 | Brockbank | Feb. 12, 1924 |
| 2,431,327 | Geiger | Nov. 27, 1947 |
| 2,597,964 | Winter | May 27, 1952 |
| 2,677,627 | Montgomery et al. | May 4, 1954 |
| 2,955,958 | Brown | Oct. 11, 1960 |

UNITED STATES PATENT OFFICE
CERTIFICATE OF CORRECTION

Patent No. 3,095,316 — June 25, 1963

Jurgen Hartwig

It is hereby certified that error appears in the above numbered patent requiring correction and that the said Letters Patent should read as corrected below.

In the heading to the printed specification, lines 2 and 3, for "PROCESS FOR COATING CARBONACEOUS ARTICLES WITH SILICON DIOXIDE" read -- PROCESS FOR COATING CARBONACEOUS ARTICLES WITH SILICON CARBIDE --; column 1, line 65, for "$\beta$-Sic" read -- $\beta$-SiC --.

Signed and sealed this 7th day of January 1964.

(SEAL)
Attest:

ERNEST W. SWIDER
Attesting Officer

EDWIN L. REYNOLDS
Acting Commissioner of Patents